United States Patent [19]
Jones et al.

[11] Patent Number: 6,128,989
[45] Date of Patent: Oct. 10, 2000

[54] SAWING APPARATUS

[75] Inventors: Aaron U. Jones, 1880 McLean Blvd., Eugene, Oreg. 97405; Edward Komori, Eugene, Oreg.

[73] Assignee: Aaron U. Jones, Eugene, Oreg.

[21] Appl. No.: 08/642,590

[22] Filed: May 3, 1996

Related U.S. Application Data

[63] Continuation of application No. 08/152,427, Nov. 12, 1993, abandoned.

[51] Int. Cl.⁷ .............................. B27B 5/04; B27B 31/06
[52] U.S. Cl. .................................. 83/156; 83/365; 83/368; 83/425; 83/425.4; 83/436.1; 83/436.7; 83/436.9; 83/477.1; 83/580.3; 144/247; 144/248.6; 144/357; 144/399
[58] Field of Search ........................... 83/356.3, 368, 83/425.3, 425.4, 425.2, 474, 475, 477.1, 154, 155, 156, 118, 119, 436, 441, 476, 508.2, 508.3; 144/116, 117 R, 246 A, 246 D, 246 E, 246 F, 246 G, 357, 130, 398, 399

[56] References Cited

U.S. PATENT DOCUMENTS

| | | | |
|---|---|---|---|
| 745,780 | 12/1903 | Calvert | 83/155 X |
| 946,336 | 1/1910 | Class | 83/155 X |
| 1,794,758 | 3/1931 | Dittmar | 83/478 |
| 1,802,514 | 4/1931 | Johnson | 83/425.4 |
| 3,202,189 | 8/1965 | Pearson | 83/508.3 X |
| 3,513,321 | 5/1970 | Sherman | 144/357 X |
| 3,747,457 | 7/1973 | Thompson | 83/477.1 X |
| 4,078,592 | 3/1978 | Standal | 144/247 X |
| 4,239,069 | 12/1980 | Zimmerman | 144/39 |
| 4,468,992 | 9/1984 | McGeehee | 83/56 |
| 4,594,815 | 6/1986 | Mickelson et al. | 144/246 A X |
| 4,724,877 | 2/1988 | Culley, Jr. | 144/116 |
| 4,777,854 | 10/1988 | Rice | 83/425.4 |
| 4,825,917 | 5/1989 | Gönne | 144/3 P |
| 4,901,611 | 2/1990 | Bentley | 83/368 X |
| 5,052,452 | 10/1991 | Goenner | 83/368 X |
| 5,143,127 | 9/1992 | Rautio | 144/39 |
| 5,148,847 | 9/1992 | Knerr | 144/357 |
| 5,287,782 | 2/1994 | Scott | 83/425.3 X |
| 5,325,751 | 7/1994 | Green et al. | 83/508.3 X |
| 5,367,930 | 11/1994 | Lemley | 83/368 |
| 5,396,938 | 3/1995 | Cannaday | 144/357 |

FOREIGN PATENT DOCUMENTS

60102   11/1938   Norway .................................. 83/436

*Primary Examiner*—Clark F. Dexter
*Attorney, Agent, or Firm*—Dellett and Walters

[57] ABSTRACT

A sawing apparatus comprises a base structure including bed rolls defining a horizontal bed plane for supporting a workpiece, a saw arbor carrying at least one saw for rotation about the central axis of the saw arbor, and a carriage supporting the saw arbor so that its central axis extends horizontally above the bed plane. A drive mechanism selectively raises and lowers the carriage relative to the base structure.

7 Claims, 11 Drawing Sheets

SAWING APPARATUS

This application is a continuation of application(s) Ser. No. 08/152,427 filed on Nov. 12, 1993, now abandoned.

BACKGROUND OF THE INVENTION

This invention relates to sawing apparatus and particularly to a sawing apparatus adaptable to receive cants of varying thickness.

In a conventional sawmill, a generally cylindrical log is cut substantially longitudinally to form flitches, each flitch having two parallel main faces and one or two wane edges. The flitch is sawn to remove the wane edge(s), and the resulting cant is delivered longitudinally to a gang edger for cutting into boards or strips.

A conventional gang edger comprises plural bed rolls that define a horizontal bed plane and multiple circular saws mounted on a common horizontal arbor positioned below the bed plane. Saw guides of durable low friction material, such as Babbitt metal, are provided between each two adjacent saws, just below the bed plane. A cant that is to be edged is fed through the edger on the bed rolls so that the surface of the cant toward the teeth entering the cant is close to the saw guides and the saw guides limit wandering of the saws as the cant is fed through the edger. This type of edger provides high accuracy in sawing, but has a disadvantage in that the cutting teeth pass upwardly through the cant, causing sawdust to be thrown upwardly. Efficient collection of this sawdust material is difficult.

The foregoing disadvantage may be avoided if the saw arbor were placed above the cant, whereby the sawdust is thrown downwardly and collected beneath the bed plane of the edger. However, this construction has not hitherto been practical because cants are usually not all the same thickness. For example, an edger might have to handle cants having a minimum nominal thickness of four inches up to a maximum nominal thickness of ten inches in approximately two inch increments. If the arbor were positioned to allow ten inch cants to be cut, a four inch cant would be approximately six inches from the saw guides, and accordingly the sawing accuracy of the edger would be seriously impaired.

SUMMARY OF THE INVENTION

It is accordingly an object of the present invention to provide an improved edger method and apparatus capable of receiving and accurately sawing cants of varying thickness while enabling efficient collection of sawdust material.

In accordance with the present invention an edger includes a saw carriage upwardly movable relative to the edger bed plane. The saw arbor is positioned on the carriage above the cant to be sawn, according to the thickness of the cant, and rotates in a direction for propelling sawdust downwardly where it is readily collected.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
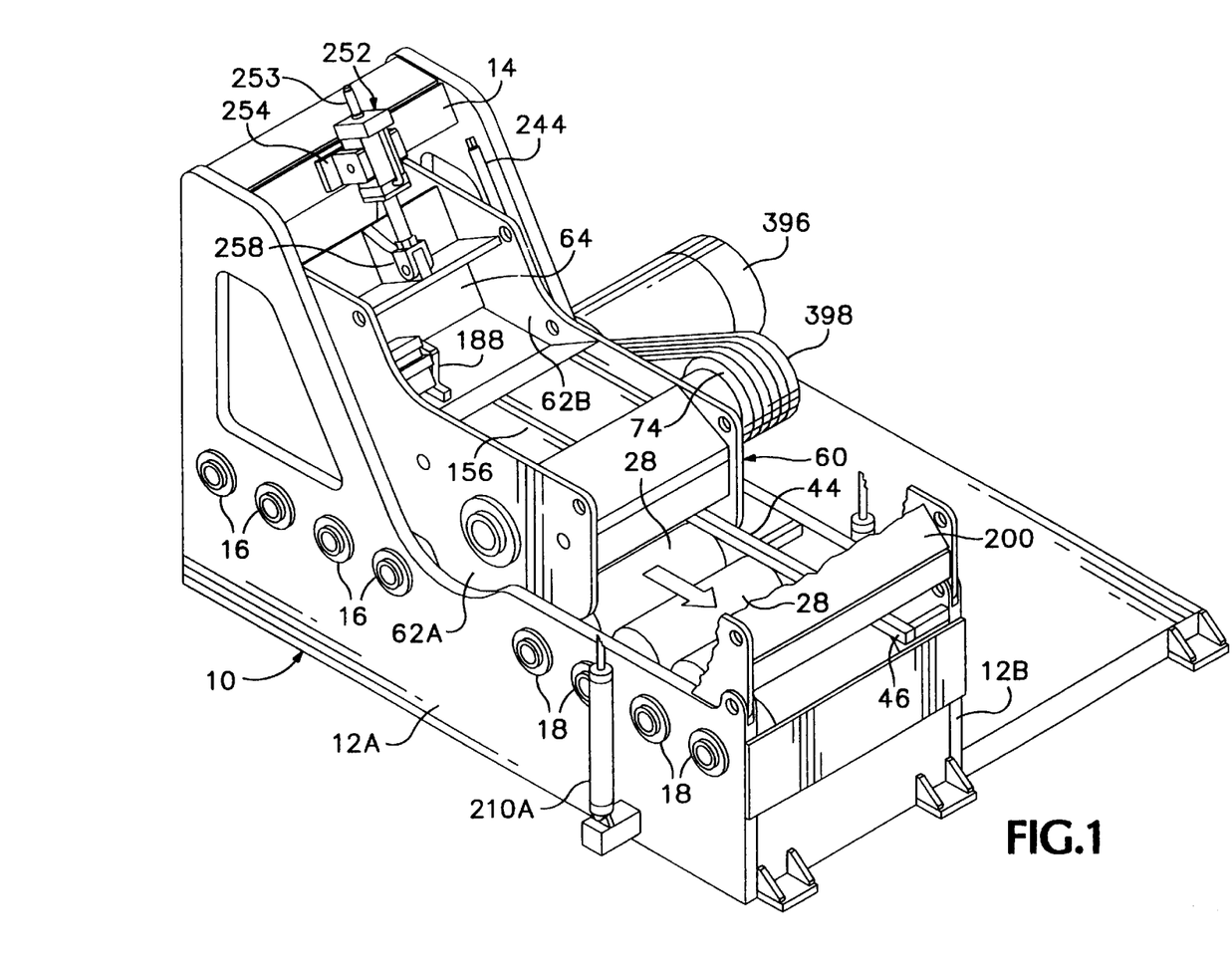
FIG. 1 is a perspective view, partly broken away, of a gang edger according to the present invention, the gang edger having an infeed end and an outfeed end.
Figure 5:
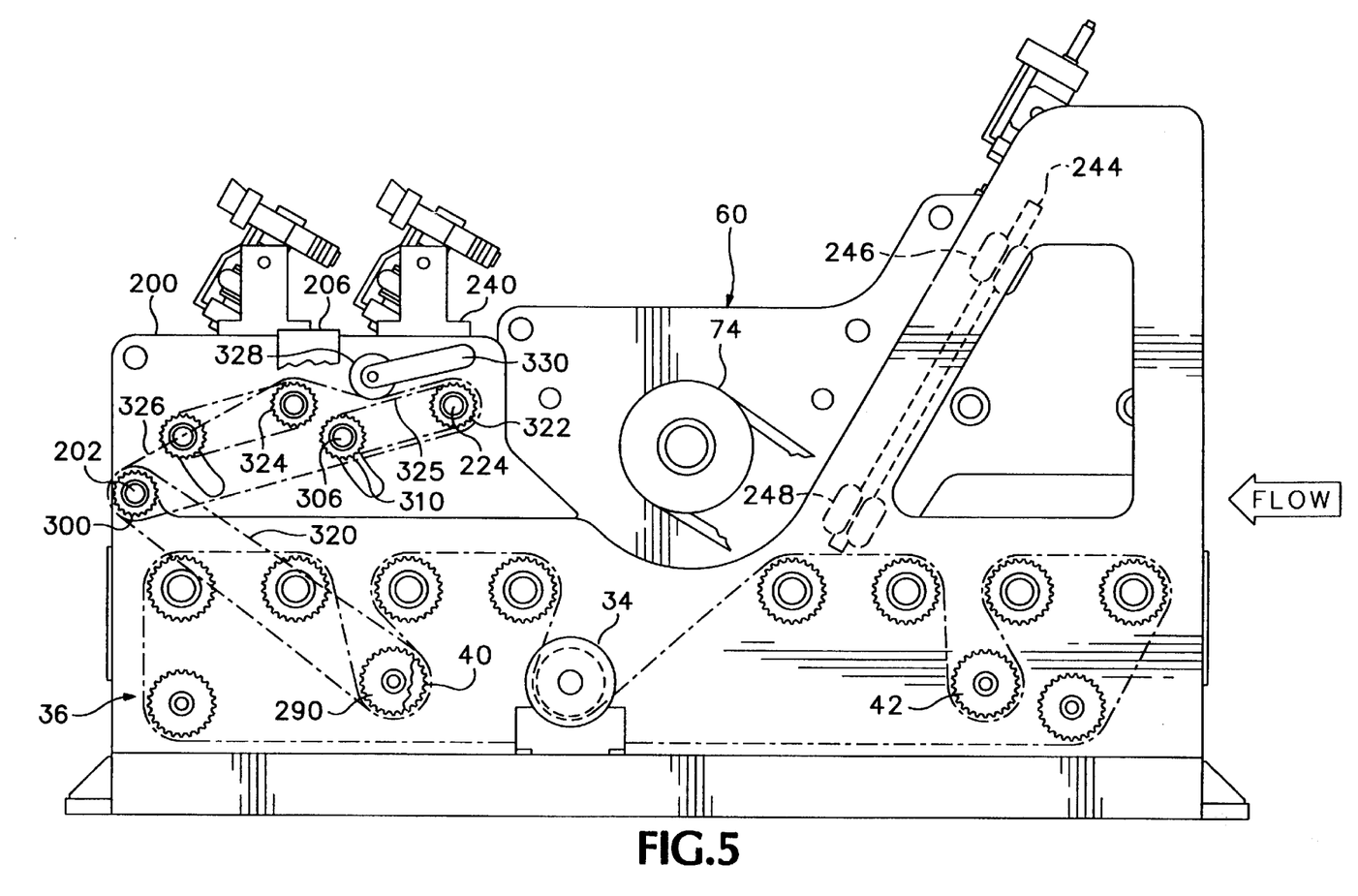
FIG. 5 is a first, partly broken away side view of the edger.

Referring to the drawings and particularly to FIGS. 1 and 2, the illustrated gang edger comprises a base structure 10 composed of two longitudinal side plates 12A, 12B held in spaced parallel relation by transverse members, including a transverse plate 14. The two side plates 12 each contain two sets of bearing housings, namely infeed roll bearing housings 16 and outfeed roll bearing housings 18 accommodating infeed bed roll bearings and outfeed bed roll bearings respectively. The infeed and outfeed bed rolls 24 and 28 define a horizontal bed plane 30. Referring to FIG. 5, the infeed and outfeed bed rolls are driven by a motor 34 that is coupled to the bed rolls by a chain and sprocket arrangement 36 further including sprockets 40 and 42. The sprocket 40 is mounted on a shaft that also carries a sprocket 290. Thus, sprocket 290 rotates with sprocket 40 for a purpose that will become apparent hereinbelow. A line bar 44 (FIG. 1) is secured to the plate 12B and extends horizontally, just above the bed plane 30. The line bar 44 has a vertical surface 46 that constitutes an alignment straight edge for guiding movement of cants through the edger.

As can be seen in FIG. 1, the side plates 12 are upswept at the infeed end of the edger. A saw carriage 60 is accommodated partially between the upswept portions of the side plates 12 and comprises two side plates 62A and 62B held in spaced parallel relationship by transverse members, including a weldment 64. The carriage 60 is supported for movement relative to the base structure 10 by means of two, parallel linear guides, each disposed at an angle with respect to the vertical. Each linear guide comprises a cylindrical bar 244 mounted on one of the plates 12A, 12B and upper and lower bearings 246, 248 (FIG. 5) mounted on the carriage 60 and engaging the bar 244. A double-acting hydraulic cylinder 252 is located between a pair of trunnion brackets 254 attached to the transverse plate 14 of the base structure 10 and a clevis 258 attached to the weldment 64. Hydraulic fluid to the hydraulic cylinder 252 is supplied from a hydraulic system for the purpose of moving the carriage along the linear guide bars. The hydraulic cylinder is preferably fitted with a linear transducer 253 which supplies an output signal indicating the height of the saw carriage relative to the bed plane 30. The signal produced by the transducer is suitably provided as a feedback value to control system 251 that is also responsive to cant thickness measurement.

The carriage 60 moves within a few inch clearance between the side plates 12A and 12B, except in the vicinity of two braking strips 264, which extend parallel to the cylindrical bars 244. The carriage includes two hydraulic braking cylinders 266, each provided with a pad of friction material. When the cylinders 266 are actuated, they force the pads of friction material against the respective braking strips 264, thereby holding the carriage against movement relative to the base structure. Since the side plate 62B of the carriage 60 extends below the level of the bed plane 30, the supports 270 for line bar 44 are spacid to accommodate side plate 62B.

Figure 8:
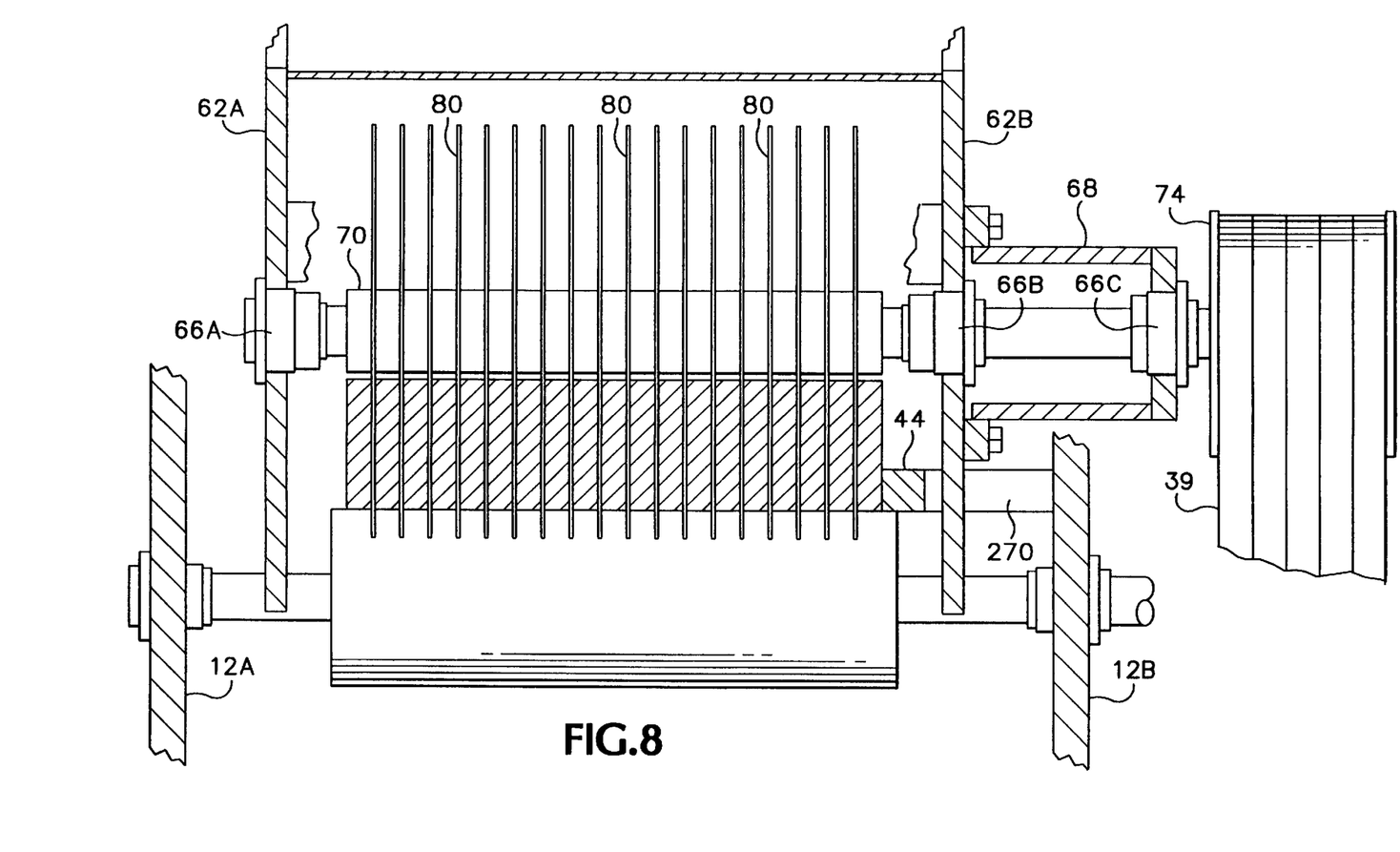
FIG. 8 is a cross-sectional view of the edger showing the saw arbor.

Referring to FIG. 8, the side plates 62A and 62B are provided with bearings 66A and 66B while third bearing 66C is supported via sleeve 68 that extends in cantilever fashion from side plate 62B. The three bearings 66A, 66B and 66C are coaxial, their common axis being horizontal, and they support a saw arbor 70 for rotation, the arbor being provided with a drive sheave 74 at its outer end. Sheave 74 is driven from motor 396 via belts 398. A portion of the saw arbor 70 that is between the bearings 66A and 66B is of greater diameter than the rest of the saw arbor and is formed with longitudinal grooves to provide a spline. Multiple circular saws 80 are fitted on the spline.

Figure 6:
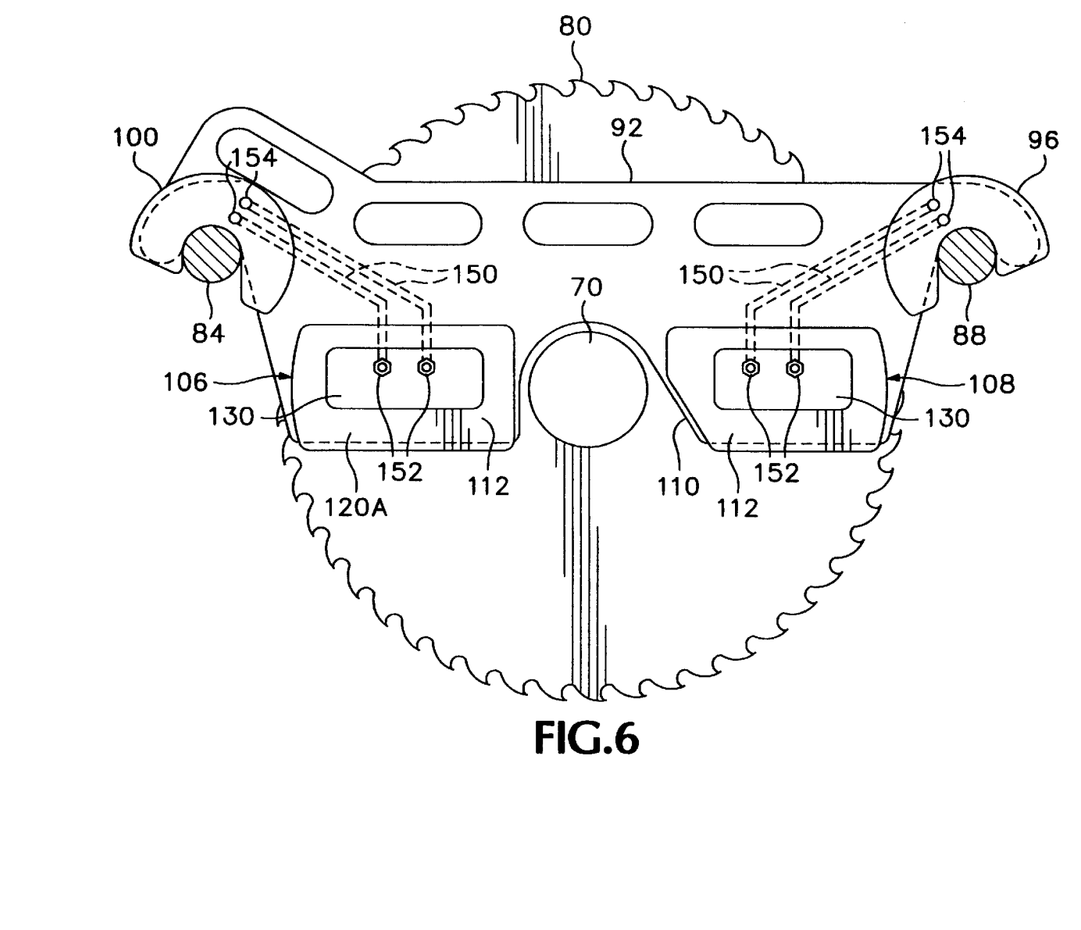
FIG. 6 is a side view illustrating saw guides.

Two horizontal bars 84 and 88 (FIG. 6) extend between the side plates 62 of the carriage, parallel to the saw arbor 70. Multiple saw guide arms 92 (FIGS. 6 and 7) are mounted on the bars, each one between two adjacent saws and each guide arm comprising a plate that is disposed vertically and extends in a plane perpendicular to the central axis of the saw arbor. A C-shaped spacer plate 96 is at the downstream end of the guide arm and rests on the bar 88, while a C-shaped spacer plate 100 is at its upstream end, resting on the bar 84. The guide arms are substantially narrower than the spacing between two adjacent saws and are positioned relative to the saws by the spacer plates 96 and 100.

Figure 7:
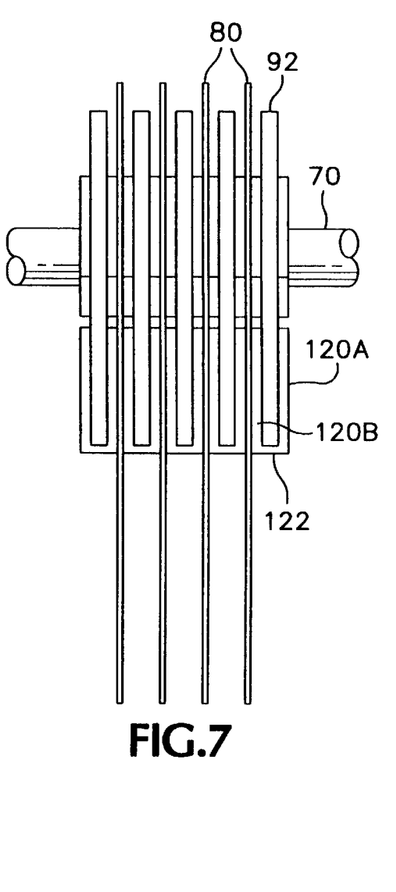
FIG. 7 is an end view also illustrating saw guides.

Each guide arm includes saw guide mounting areas 106, 108, spaced apart by a generally semicircular recess 110. When the guide arm is installed and is mounted on bars 84 and 88, the mounting areas 106 and 108 are upstream and downstream respectively of arbor 70, the latter extending through the recess 110. Two saw guides 112, of durable low friction material, such as Babbitt metal, are mounted at the mounting areas 106 and 108 respectively of a guide arm. As shown in FIG. 7, a saw guide is substantially U-shaped, and is composed of side plate portions 120A and 120B joined by a base portion 122. The side plate portions 120 define generally rectangular openings 130 through which a guide arm is exposed. The spacing of the saws is related to the thickness of the saw guides such that a very narrow clearance, on the order of about 0.001 inch, exists between the guides and each adjacent saw.

The guide arms 92 are each formed with lubricant passages 150 that communicate with outlet bores 152 within areas 106 and 108 that are exposed through the openings 130. Lubricant is supplied to the passages 150 by bores 154 in spacers 96 and 100. Bores 154 in successive spacers 96 and 100 are aligned, and the resulting passages extend substantially the entire length of the bars 84 and 86. Those bones are plugged at one end and are connected at the other end to a source of lubricant (not shown).

Figure 9:
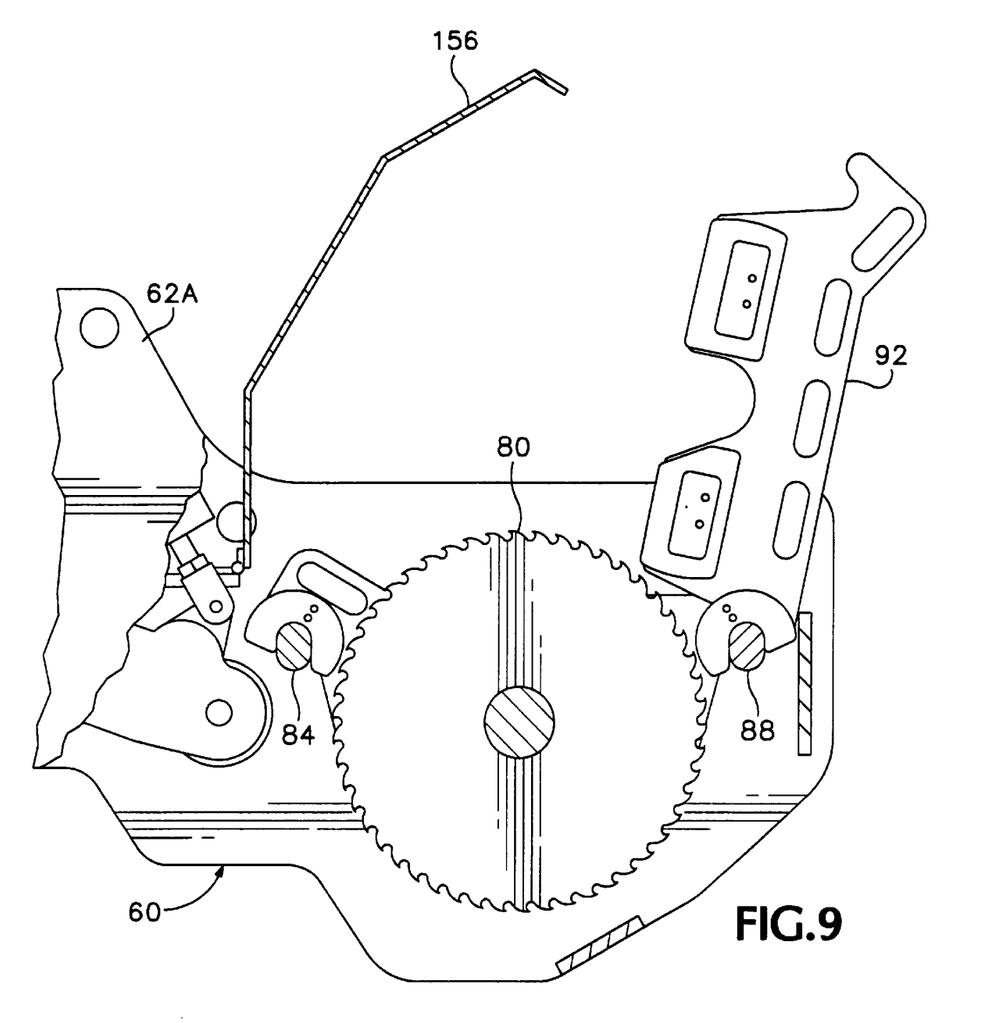
FIG. 9 illustrates pivoting of saw guides.

A saw guard 156 is hinged to the weldment 64 at the downstream end thereof, and when the guide arms 92 engage the bars 84 and 88, the guard 156 can pivot between a closed position, shown in FIG. 1, and an open position, shown in FIG. 9.

The saw carriage 60 also includes two infeed holddown roll assemblies 170, 172. Assembly 170 comprises a shaft 174 journaled to the plates 62A, 62B. Brackets 176A, 176B extend from the shaft 174 in a forward and somewhat downward direction while a square section hollow beam 180 is disposed between these two brackets for holding them in a spaced, parallel relationship. At their forward ends, the brackets 176 journal a shaft 178 on which is mounted a holddown roll 182. Holddown roll 182 is rotated via a gear train comprising gears 420, 422 and 424 wherein gear 420 is secured to shaft 178 to which holddown roll 182 is keyed. Gear 424 is driven by a hydraulic motor (not shown) mounted inside hollow beam 180.

An arm 184 extends from beam 180 in a forward and somewhat upward direction. A pair of trunnion brackets 188 are mounted on weldment 64, and a pneumatic cylinder 192 is mounted between the trunnion brackets 188, with the cylinder's piston being connected to the free end of arm 184. Cylinder 192 is used to force the roll 182 downwardly relative to the saw carriage to a position such that its bottom surface is about 1 cm below the saw guides.

The construction and operation of infeed holddown roll assemblies 170 and 172 are essentially the same. Both assemblies rotate a holddown roll for cooperating in the forward propulsion of a cant fed into the edger.

Figure 10:
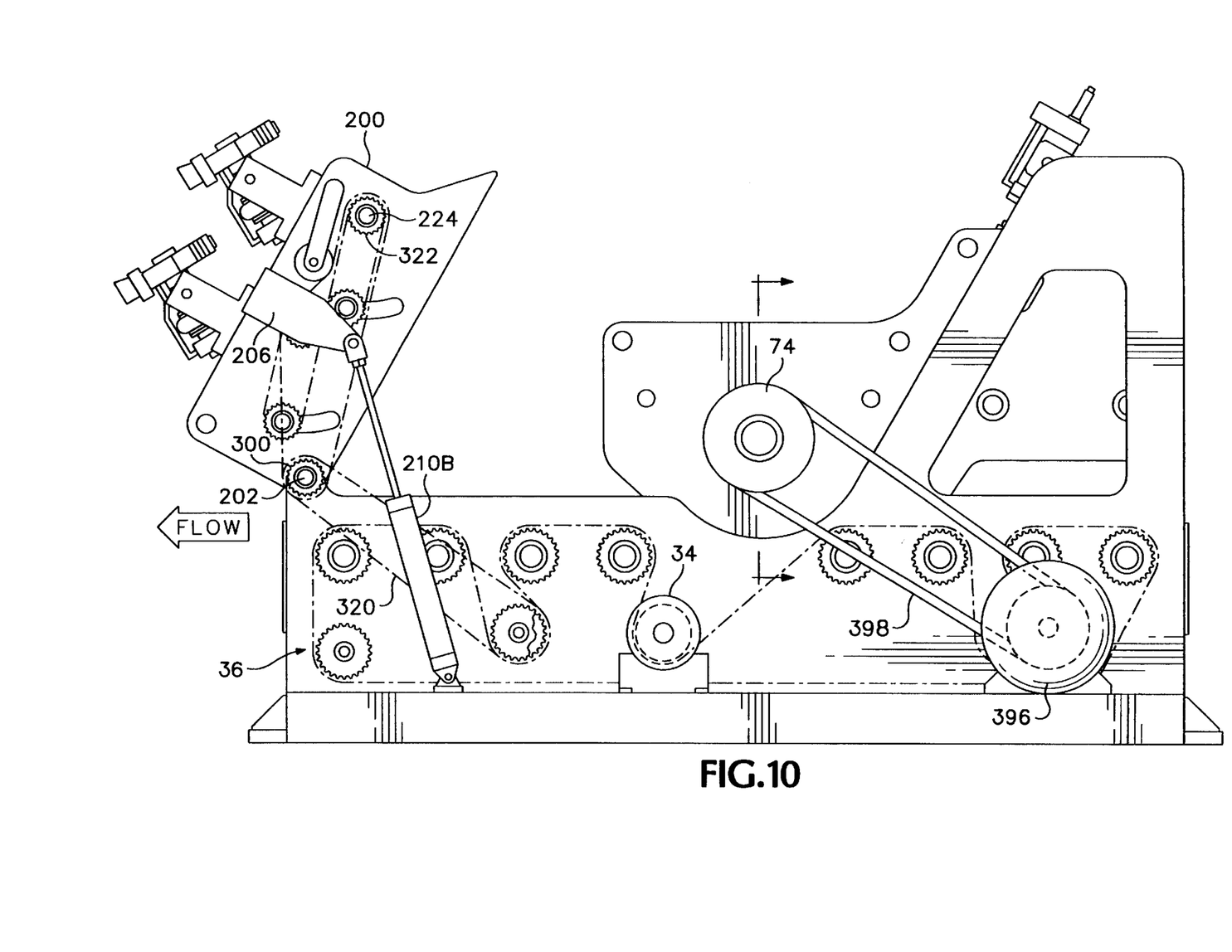
FIG. 10 is a second, partially broken away side view illustrating the outfeed cover in raised position.

An outfeed cover 200 is pivotally connected to the base structure 10 at the downstream end of the edger at shaft 202 which carries a sleeve on which sprockets 300 are mounted. Brackets 206 are connected to the top of the cover at a location upstream of the pivot axis when the cover is in the closed position (FIG. 5), and these brackets are coupled to the base structure 10 through respective double-acting pneumatic cylinders 210A and 210B. The cylinders 210 can be used either to raise the outfeed cover 200 and provide access to the outfeed bed rolls as shown in FIG. 10, or to firmly hold the cover in closed position as shown in FIG. 5.

Two outfeed holddown roll assemblies 214 and 216 are mounted to cover 200. The holddown roll assembly 214 includes a shaft 224 that is journaled to the side plates of cover 200. Two brackets 226A and 226B extend from the shaft 224 in a forward and somewhat downward direction while square section hollow beam 230 is secured between the two brackets 226 for holding them in a spaced, parallel relationship. At their forward ends, the brackets 226 journal a shaft 306 on which is mounted a holddown roll 308, the shaft 306 being further provided with a sprocket 310 (FIG. 5).

Approximately halfway between the two opposite ends of beam 230, an arm 234 extends in a forward and somewhat downward direction. An actuator 238 is mounted between a pair of trunnion brackets 240 secured to the top of the cover 200, actuator 238 comprising a double-acting hydraulic cylinder 247 having its piston pivotally connected to the aforementioned arm 234. A pneumatic spring 250 is interposed between the hydraulic cylinder and trunnion brackets 240. Hydraulic fluid is supplied to the hydraulic cylinder 247 from a hydraulic circuit by way of a filter 242.

The shaft 224 extends beyond the cover side plate 12B where it is provided with spaced sprockets 322. A chain 326 couples one of these sprockets to a sprocket 300 for rotating the shaft 224, while a chain 325 couples the other sprocket 322 for rotating roll 308 via sprocket 310 and shaft 306. Holddown roll assembly 216 is provided with sprockets 324 similar to sprockets 322, a sprocket 322 and a sprocket 324 being rotated by means of a chain 326 driven from a sprocket 300 and held under tension by sprocket 328 located on spring biased arm 330. Drive sprocket 290 is coupled to sprocket 300 via chain 320 for rotating sprocket 300.

In operation, the assembly 214 positions the roll 308 at a predetermined height relative to the bed plane 30, wherein pneumatic spring 250 allows limited upward movement of roll 308. The operation of the outfeed holddown roll assembly 216 is essentially the same as that of assembly 214.

When the bedrolls are driven to rotate, the holddown rolls also rotate, and the peripheral speed of the holddown rolls is essentially equal to the peripheral speed of the bedrolls. Accordingly, a cant that is fed into the edger at the infeed end thereof is propelled forcibly and in a controlled fashion through the edger and is discharged from the edger at the downstream end thereof.

A sensor array 400 is mounted upstream of the gang edger for detecting the thickness of a cant being fed to the edger. A preferred implementation of the invention is designed to accommodate cants the nominal thickness of which is four inches, six inches, eight inches or ten inches, and accordingly the sensor array includes four LED photodiodes 402 for detecting these four nominal thicknesses of a cant. Light sources (not shown) are provided opposite the photodiodes such that cants break the light beam. The output signal provided by the sensor array is delivered to control system 251 for operating hydraulic cylinder 252.

Figure 2A:
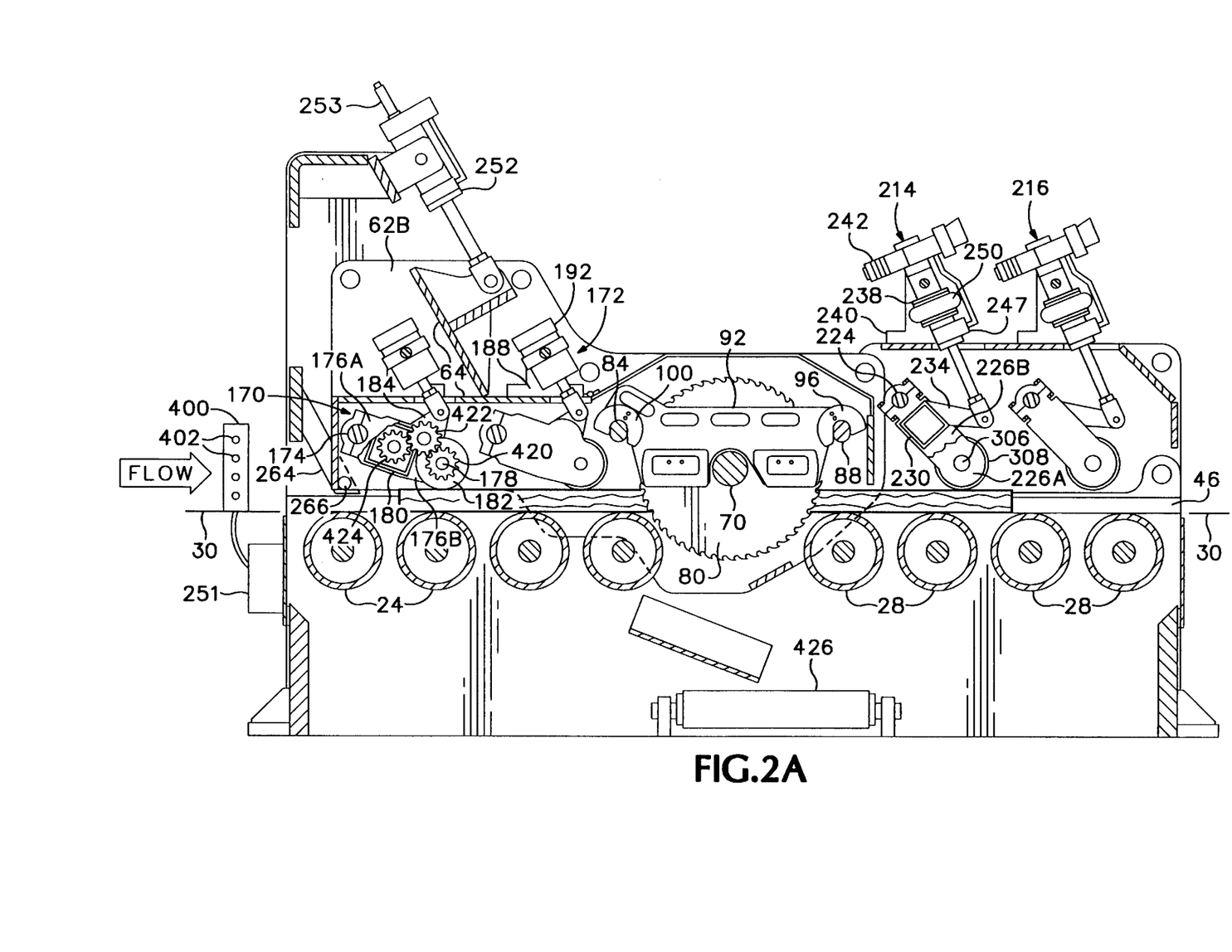
FIG. 2A is a longitudinal sectional view of the edger illustrating use of the edger to cut a first cant.
Figure 2B:
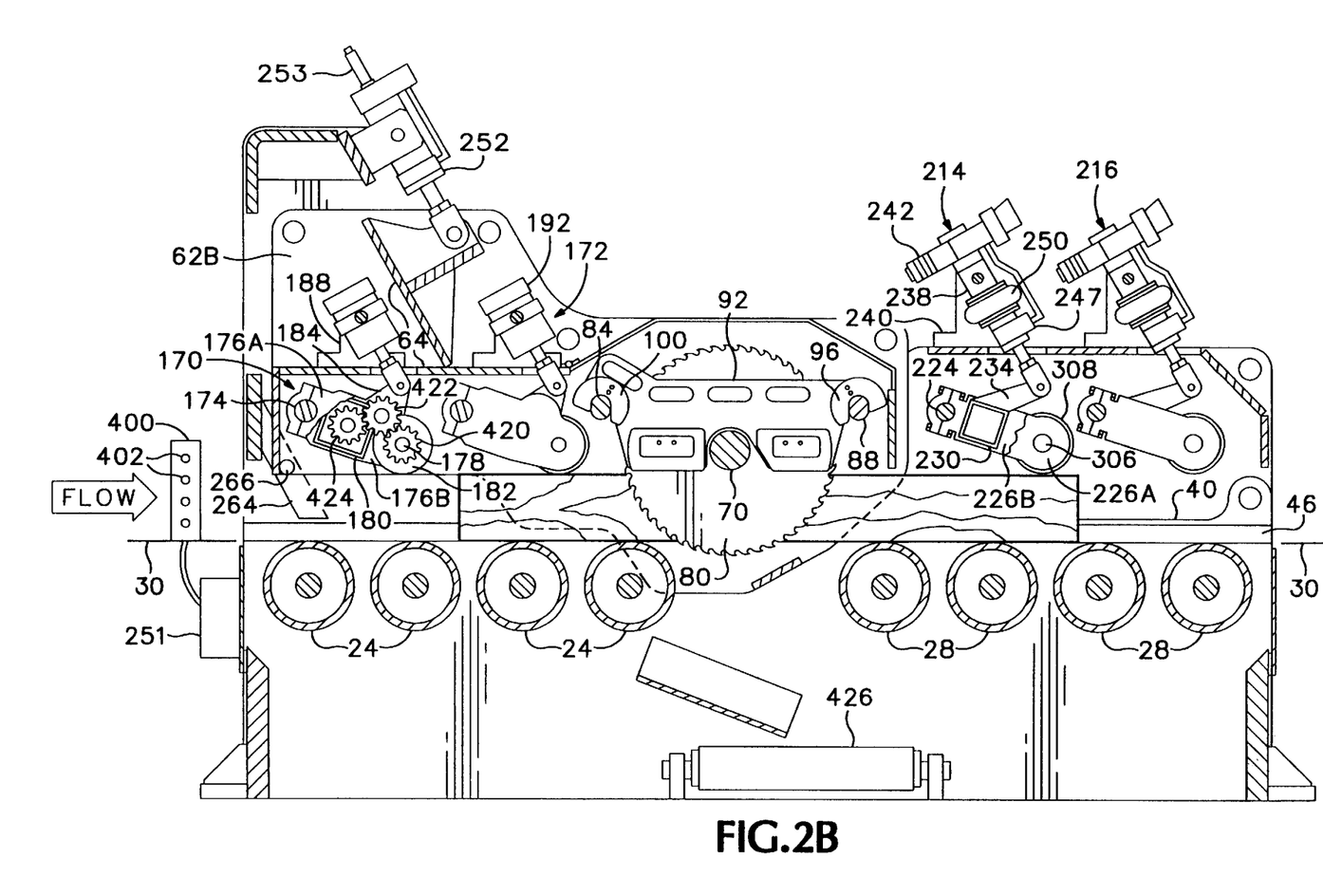
FIG. 2 is a longitudinal sectional view of the edger cutting a second and thicker cant.
Figure 3:
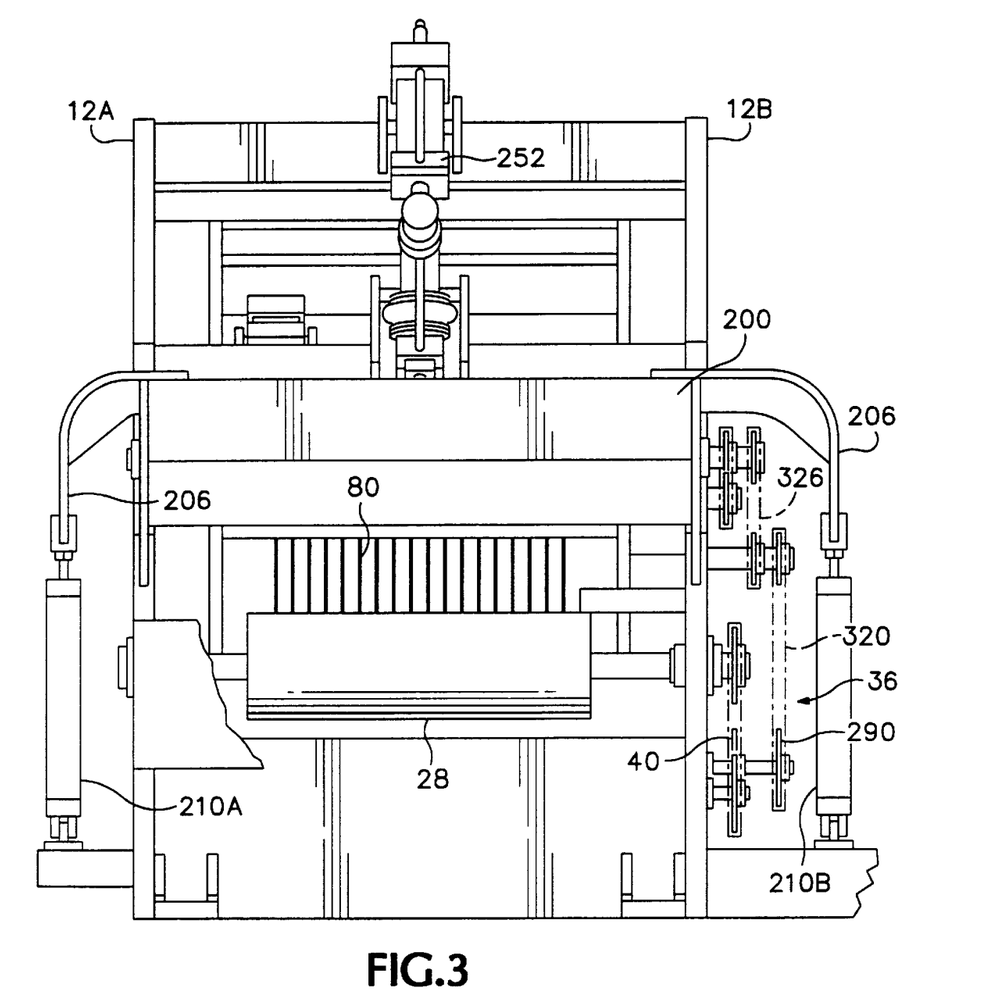
FIG. 3 is an outlet end view of the edger according to the present invention.
Figure 4:
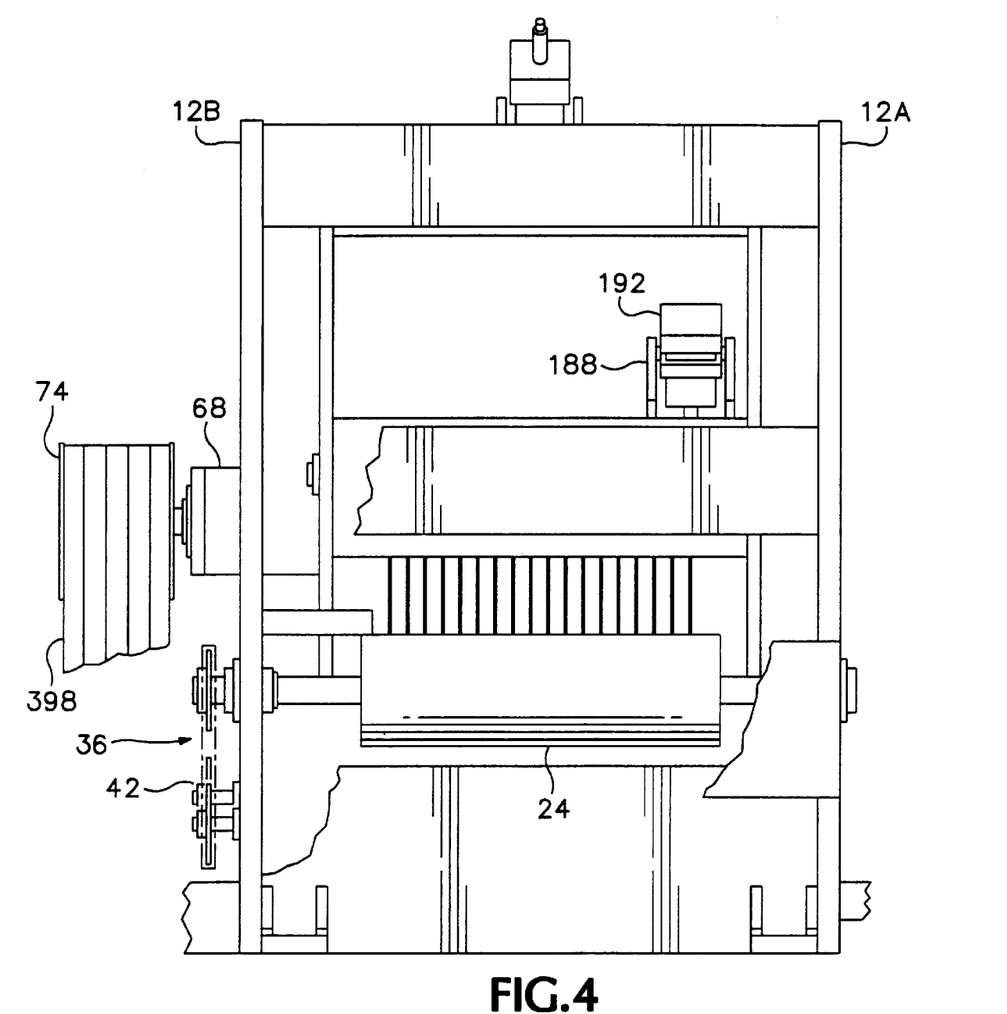
FIG. 4 is an inlet end view of the same edger.

In operation of the edger as above described, the thickness of a new cant being delivered to the edger is sensed by the sensor array which provides the control system with information representing the thickness of the cant. If the thickness of the cant is the same as the thickness of the previous cant, the saw carriage remains at the same height and the outfeed holddown rolls also remain at the same height. However, if the new cant is of a different thickness from the previous cant, the level of the saw carriage is adjusted accordingly, including the infeed rolls. Brake cylinders 266 are vented, and double-acting cylinder 252 is operated to raise or lower the carriage 60 to the desired new height for correct and accurate sawing. The linear transducer 253 suitably provides a feedback signal to the control system for indicating the height provided by cylinder 252 to ensure that the carriage is brought to the proper level. When the carriage is at the proper height, the brake cylinders 266 are pressurized, locking the carriage 60 relative to the base frame 10. Also, the outfeed holddown roll assembly 214 is actuated by means of cylinder 247 to position holddown roll 308 so that its bottom surface is approximately 0.6 cm below the top surface of the new cant. Assembly 216 is similarly operated. As the new cant is fed into the edger at the infeed end thereof, it is gripped between the infeed bed rolls and the infeed holddown rolls and is propelled towards the saws, whereby the cant is cut longitudinally. Downstream of the saws, the resulting strips or boards are forced between the outfeed bed rolls and the outfeed holddown rolls, which push upward slightly against the force provided by pneumatic spring 250. Consequently, the strips or boards are fed from the edger by the operation of the outfeed bed rolls and the outfeed holddown rolls. FIG. 2A illustrates reception of a cant of a first thickness, while FIG. 2B illustrates the result of an above-described level change for sawing a cant of a different and greater thickness.

It will be appreciated that saws 80 rotate in a counter-clockwise direction as shown in FIG. 2 and accordingly sawdust is thrown downwardly. A conveyor 426 is suitably provided beneath the bed rolls 24 and 28 to collect sawdust and remove it.

Figure 11:
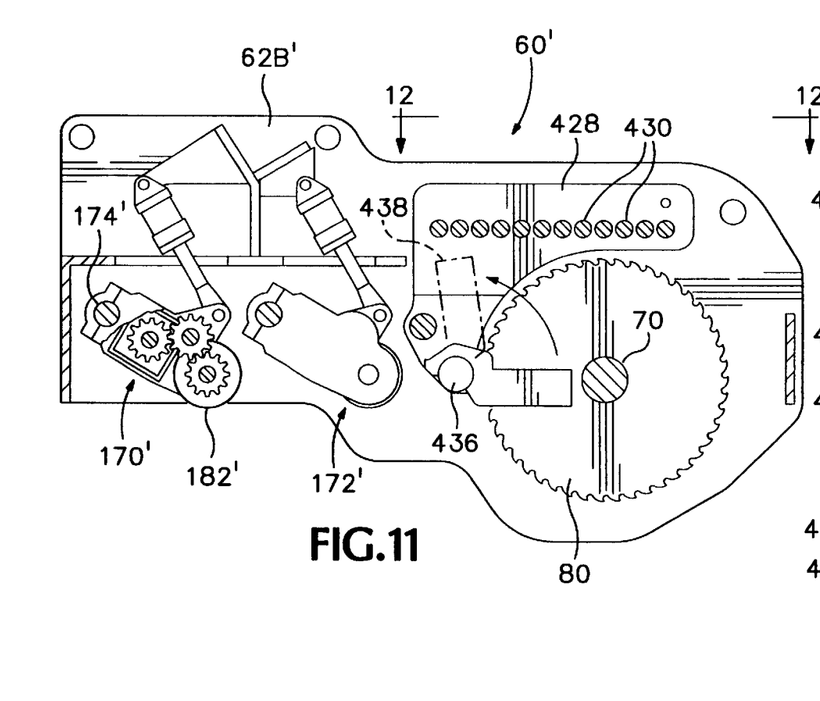
FIG. 11 is a side view, partially broken away and in cross section of a saw carriage according to a second embodiment.
Figure 12:
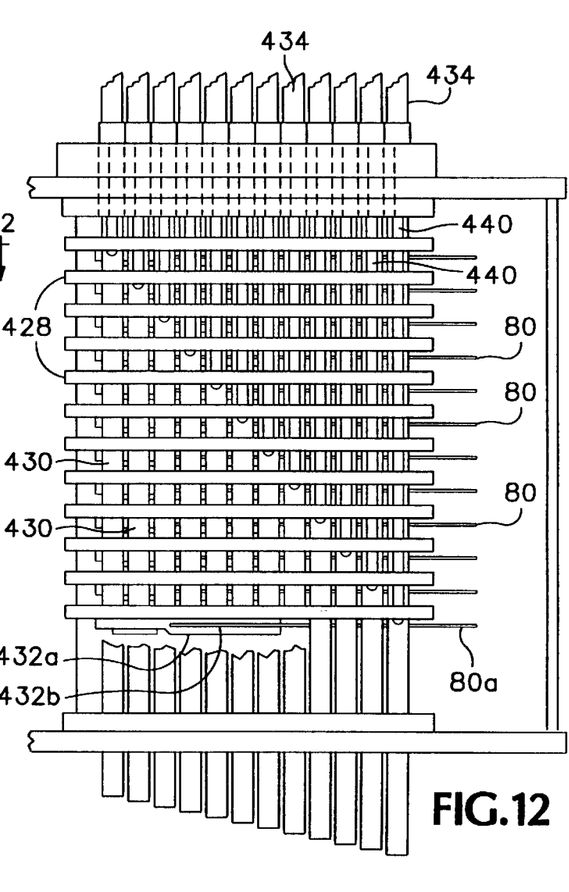
FIG. 12 is a plan view, partially broken away, as taken at 12—12 in FIG. 11.

Referring to FIGS. 11 and 12, a second embodiment is illustrated having setting saws instead of relatively fixed spaced saws as described for the previous embodiment. Setting saws are preferred when selectable width boards or strips are to be cut. A plurality of circular saws 80 have a splined connection with arbor 70 extending between the side plates of carriage 60', the saws being slideable along the arbor to provide variable spacing. A plurality of guide arms 428 are movable along glide rods 430 positioned between the carriage side plates, each of the guide arms carrying at one side thereof a bifurcated saw guide 432. Sides 432a and 432b of a saw guide are adapted to receive a saw blade 80a therebetween as illustrated in FIG. 12. The guide arms 428 are laterally movable under the control of setworks hydraulic cylinders 434 wherein the actuating rod 440 of each cylinder is secured to a different guide arm. It will be seen that the saws 80 are positionable laterally across the carriage under the control of setwork cylinders 434 whereby various sizes of boards or strips can be sawn. The saw guides 432 are rotatable in a counter-clockwise direction about pivot 436 to the position illustrated in dashed lines at 438 for facilitating removal of the saw blades. Other than as hereinabove described, operation according to the second embodiment is the same as operation according to the first described embodiment.

It will be appreciated that the invention is not restricted to the particular embodiments described and illustrated, and variations may be made therein without departing from the scope of the invention as defined in the appended claims.

We claim:

1. Edger apparatus comprising:

a base structure including means defining a horizontal bed plane for supporting a workpiece, a saw arbor having a central axis, at least one saw carried by the saw arbor for rotation about said central axis, a carriage means supporting the saw arbor so that said central axis extends horizontally above the bed plane, sensor means for determining a thickness of said workpiece, and power means operatively connected to said sensor means for raising and lowering the carriage means relative to the base structure in accordance with the thickness of said workpiece to bring said saw arbor within a predetermined distance of said workpiece.

2. Edger apparatus comprising:

a base structure including means defining a horizontal bed plane for supporting a workpiece, a saw arbor having a central axis, at least one saw carried by the saw arbor for rotation about said central axis, a carriage means supporting the saw arbor so that said central axis extends horizontally above the bed plane, power means for raising and lowering the carriage means relative to the base structure, and sensor means for providing a thickness indication representative of the vertical extent of a workpiece before it is fed into the saw, said power means being operatively connected to said sensor means so as to be responsive thereto in a first condition, in which it raises the carriage means, or in a second condition, in which it lowers the carriage means.

3. Edger apparatus according to claim 2 further comprising:

at least one outfeed holddown roll positioned on the base structure for bearing downwardly on said workpiece, and an actuator means for selectively raising or lowering the outfeed holddown roll relative to the base structure, said actuator being operatively connected to said sensor means so as to be responsive to said thickness indication indicating the vertical extent of the workpiece.

4. Edger apparatus according to claim 3 wherein said actuator means comprises a hydraulic cylinder having a piston coupled to the holddown roll, and a resiliently yieldable means effective between the hydraulic cylinder and the base structure, whereby the holddown roll is upwardly yieldable relative to the base structure.

5. Edger apparatus according to claim 2 wherein said workpiece is advanced in a first direction over said bed plane on said means defining the horizontal bed plane, said edger apparatus further comprising:

a follower member for engaging an upper surface of the workpiece, a support arm supporting the follower member for pivotal movement about a horizontal axis that is perpendicular to said first direction, and an actuator means operatively connected to said sensor means so as to pivot the support arm in response to said thickness indication for causing said support arm to assume an angular position such that the follower member is at a predetermined height above the bed plane, said actuator means being provided with a resiliently yieldable means comprising a yieldable mechanism in stacked relation between the follower member and the base member whereby the follower member is upwardly yieldable relative to said base member.

6. Edger apparatus according to claim 5 wherein the actuator means comprises a hydraulic cylinder, the yieldable mechanism comprises a pneumatic spring, and the follower member is downstream of said horizontal axis relative to said first direction.

7. Sawing apparatus comprising:

a base structure including means defining a rectilinear path of movement for a workpiece, a saw structure having a saw arbor and at least one saw mounted on the saw arbor, a guide means for guiding movement of the saw structure relative to the base structure along a second path having a component perpendicular to said rectilinear path of movement, a spacing of said saw structure, including said arbor, from the rectilinear path of movement being adjustable by displacing said saw structure along the guide means, and including means on said saw structure and adjacent said rectilinear path for accurately positioning said saw along said arbor, said positioning means being moveable with said saw structure so as to be located adjacent said workpiece, wherein said second path is angularly disposed with respect to said perpendicular component.

* * * * *